United States Patent
Won et al.

(10) Patent No.: US 7,387,422 B2
(45) Date of Patent: Jun. 17, 2008

(54) LIGHT-GUIDE PLATE, BACKLIGHT ASSEMBLY HAVING THE LIGHT-GUIDE PLATE AND DISPLAY DEVICE HAVING THE BACKLIGHT ASSEMBLY

(75) Inventors: Yong-Gwang Won, Yongin-si (KR); Jeoung-Gwen Lee, Suwon-si (KR); Sung-Yong Kang, Suwon-si (KR); Jheen-Hyeok Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/505,967

(22) Filed: Aug. 17, 2006

(65) Prior Publication Data

US 2007/0070649 A1 Mar. 29, 2007

(30) Foreign Application Priority Data

Sep. 27, 2005 (KR) .................. 10-2005-0089610

(51) Int. Cl.
 *F21V 7/04* (2006.01)

(52) U.S. Cl. .............. 362/620; 362/619; 362/625; 362/626

(58) Field of Classification Search ............. 362/339, 362/614, 615, 617, 619, 620, 623, 624, 625, 362/627, 626; 349/65
See application file for complete search history.

(56) References Cited

U.S. PATENT DOCUMENTS

| | | | | |
|---|---|---|---|---|
| 6,692,133 | B2 * | 2/2004 | Katsu et al. | 362/620 |
| 6,925,243 | B2 * | 8/2005 | Lin | 362/339 |
| 2007/0047258 | A1 * | 3/2007 | Yao et al. | 362/615 |
| 2007/0047259 | A1 * | 3/2007 | Lee et al. | 362/615 |
| 2007/0189040 | A1 * | 8/2007 | Chi et al. | 362/620 |

* cited by examiner

*Primary Examiner*—Y M. Lee
(74) *Attorney, Agent, or Firm*—Cantor Colburn LLP (57) ABSTRACT

A light-guide plate includes an incident surface receiving light, an upper surface extended from a first side of the incident surface, a lower surface opposed to the upper surface and a plurality of first prisms protruding from the upper surface and spaced apart by a separation distance.

23 Claims, 11 Drawing Sheets

LIGHT-GUIDE PLATE, BACKLIGHT ASSEMBLY HAVING THE LIGHT-GUIDE PLATE AND DISPLAY DEVICE HAVING THE BACKLIGHT ASSEMBLY

This application claims priority to Korean Patent Application No. 2005-89610 filed on Sep. 27, 2005, and all the benefits accruing therefrom under 35 U.S.C. §119, the contents of which are herein incorporated by reference in its entirety.

BACKGROUND OF THE INVENTION

1. Field of the Invention

The present invention relates to a light-guide plate, a backlight assembly having the light-guide plate and a display device having the backlight assembly. More particularly, the present invention relates to a light-guide plate capable of improving image display quality, a backlight assembly having the light-guide plate and a display device having the backlight assembly.

2. Description of the Related Art

Development of information-processing devices has included various architectures, functions and faster information processing speed. The information-processing devices process information in an electrical signal format. In order to output the results processed by information-processing devices, a display device interfaces between the information-processing devices and users.

A liquid crystal display (LCD) of the display devices is lighter and smaller, displays high-resolution images and consumes less power compared to the cathode ray tube (CRT) that has been used for a long time as display device.

In general, LCD device includes a LCD panel that displays images using optical transmittance of a liquid crystal and a backlight assembly that is disposed under the LCD panel and supplies light to the LCD panel. The backlight assembly may be classified into either a direct illumination type or an edge illumination type, based on a location of a light source.

In the direct illumination type, the backlight assembly includes a plurality of light sources arranged in a parallel with each other under the LCD panel and directly supplies light generated from the light source to the LCD panel.

In the edge illumination type, the backlight assembly includes a light source, a light-guide plate that is disposed adjacent to the light source and guides the light generated from the light source into the LCD panel and a reflecting plate that is disposed under the light-guide plate to reflect leaked light advancing toward the lower portion of the light-guide plate.

In the edge illumination type, the backlight assembly may further include a prism sheet disposed on the light-guide plate to improve luminance of the light exiting from the light-guide plate. The prism sheet may include a plurality of prisms that refracts the light to enhance a front-view luminance. In order to remove the need for a prism sheet, a developed backlight assembly includes a light-guide plate having the prisms.

When the prisms are compactly disposed, the light-guide plate having the prisms emits more light through a central portion than in an edge portion. Therefore, luminance-uniformity is lowered and image display quality is deteriorated.

BRIEF SUMMARY OF THE INVENTION

In an exemplary embodiment there is provided a light-guide plate including a plurality of prisms formed on a side of the light-guide plate and spaced apart by a predetermined distance.

In an exemplary embodiment there is provided a backlight assembly having the above light-guide plate.

In an exemplary embodiment there is provided a display device having the backlight assembly.

In an exemplary embodiment, a light-guide plate includes a plurality of first prisms formed on a first side of the light-guide plate and spaced apart by a predetermined distance. Also, a plurality of dot patterns may be formed on a second side opposed to the first side. Each of the dot patterns has at least one of second prisms formed thereon. A plurality of the first prisms and a plurality of the second prisms may be respectively aligned in a row to a first direction and in a row to a second direction, and the second direction is substantially perpendicular to the first direction.

In an exemplary embodiment, a backlight assembly includes a lamp and a light-guide plate. The lamp generates light. The light-guide plate includes an incident surface onto which the light emitted from the lamp is incident, an upper surface extended from one side of the incident surface and having a plurality of first prisms spaced apart by a predetermined distance and a lower surface opposed to the upper surface.

In an exemplary embodiment, a display device includes a display panel and a backlight assembly. The display panel displays images by using light. The backlight assembly supplies the light to the display device and includes a lamp for generating light and a light-guide plate. The light-guide plate includes an incident surface onto which the light emitted from the lamp is incident, an upper surface extended from one side of the incident surface and having a plurality of first prisms spaced apart by a predetermined distance and a lower surface opposed to the upper surface.

In an exemplary embodiment, because the prisms are formed on the side of the light-guide plate and spaced apart by a predetermined distance, the light-guide plate is prevented from emitting more light in a central portion than in an edge portion relatively. Therefore, luminance distribution is uniform and image display quality is improved.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under" "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
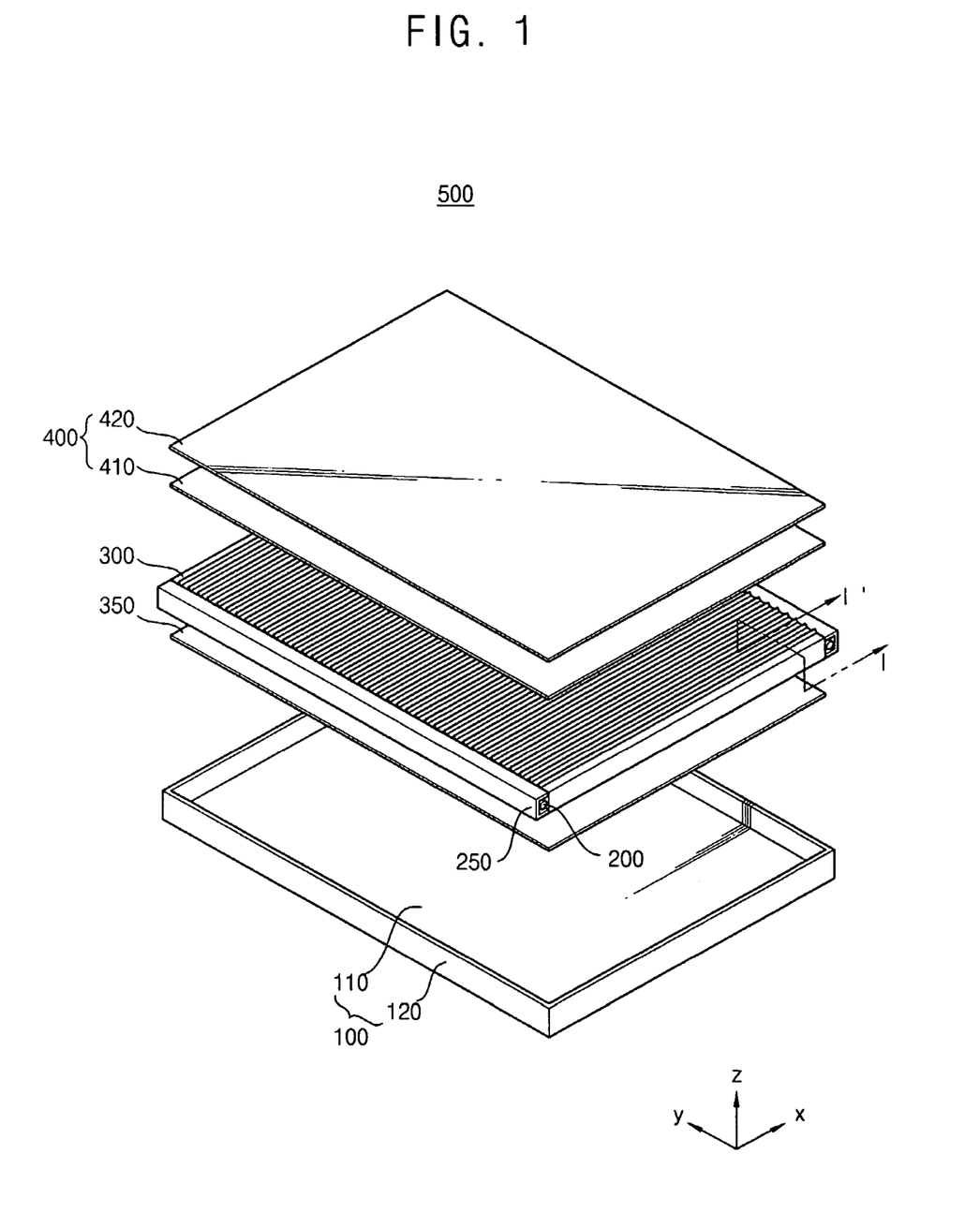
FIG. 1 is an exploded perspective view showing an exemplary embodiment of a backlight assembly according to the present invention.

FIG. 1 is an exploded perspective view showing an exemplary embodiment of a backlight assembly according to the present invention.

Referring to FIG. 1, a backlight assembly 500 includes a receiving container 100, a lamp 200, a lamp cover 250, a light-guide plate 300, a reflecting plate 350 and optical sheets 400. The backlight assembly 500 generates and emits light.

The receiving container 100 includes a bottom portion 110 and side portions 120 extended from edges of the bottom portion. The bottom portion 110 and the side portions 120 define a receiving space. The lamp 200, the lamp cover 250, the light-guide plate 300, the reflecting plate 350, the optical sheets 400 are arranged in the receiving space.

In an exemplary embodiment as illustrated in FIG. 1, the backlight assembly may be substantially frame shaped. For orientation purposes, a Cartesian coordinate system may be used where a first side of the backlight assembly extends along a Y-axis direction and a second side of the backlight assembly extends along an X-axis direction, where the Y-axis is substantially perpendicular to the X-axis and a Z-axis direction is substantially perpendicular to both the X and Y axes.

The lamp 200 has substantially a rod shape having a longitudinal direction that is substantially parallel with Y-axis and disposed in the receiving container 100. In one exemplary embodiment, a cold cathode fluorescent lamp (CCFL) having a rod shape, a low heat radiation and a high durability may be employed as the lamp 200. The lamps 200 are disposed adjacent to opposing side portions 120, respectively along X-axis. The lamps 200 face each other, making a pair, and are supplied power from an external source (not shown) to generate light. In alternative exemplary embodiments, the lamp 200 may be disposed adjacent to only one side of the side portions 120.

The lamp cover 250 covers a portion of the lamp 200 and reflects light generated by the lamp 200 to concentrate light toward the side of the light-guide plate 300. In exemplary embodiments, a longitudinal section of the lamp cover 250, for example, has substantially a U-shape. A reflecting layer may be formed on an inner surface of the lamp cover 250 for reflecting light.

The light-guide plate 300 is disposed in the receiving container 100, such that a side of the light-guide plate 300 faces the lamp 200. Two opposing sides of the light-guide plate 300 may face a pair of the lamps 200 as in the illustrated embodiment of FIG. 1. Light generated by the lamp 200 enters the light-guide plate through sides of the light-guide plate 300 adjacent to the lamps 200 and exits the light-guide plate 300 by being refracted and reflected therein.

The light-guide plate 300 shown in FIG. 1 has substantially a uniform thickness. In alternative exemplary embodiments, if the lamp 200 is disposed adjacent to only one side of the light-guide plate 300, the light-guide plate 300 may have decreasing thickness from the side adjacent to the lamp 200 such that the light-guide plate has a cross-section substantially wedge-shaped. The light guide plate includes, for example, polymethyl methacrylate (PMMA), polycarbonate (PC), etc.

The reflecting plate 350 is received in the receiving container 100, such that the reflecting plate 350 is disposed under the light-guide plate 300. The reflecting plate 350 reflects light that is leaked from the light-guide plate 300 toward the light-guide plate 300. As a result, light reflected by the reflecting plate 350 essentially enters the light-guide plate 300 again.

The optical sheets 400 are disposed on the light-guide plate 300 to improve optical characteristics. The optical sheets 400 may include, but are not limited to, a diffusion sheet 410 and/or a polarizing sheet 420. The diffusion sheet 410 is disposed on the light-guide plate 300 to diffuse light that exits from the light-guide plate 300. The polarizing sheet 420 is disposed on the diffusion sheet 410 to polarize light. The polarizing sheet 420 may include diffuse reflective polarizer film (DRPF) for reusing light absorbed by polarizing and improving luminance.

Figure 2:
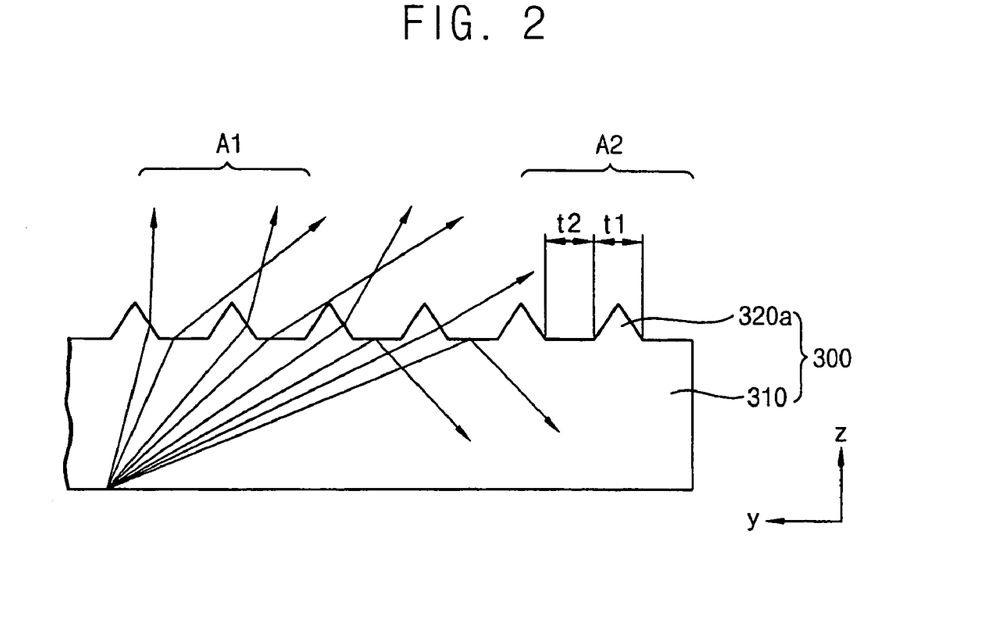
FIG. 2 is a cross-sectional view taken along line I-I' in FIG. 1.

Hereinafter, the light-guide plate 300 described above will be explained in detail with reference to the accompanying drawings. FIG. 2 is a cross-sectional view taken along line I-I' in FIG. 1.

Referring to FIG. 2, the light-guide plate 300 includes a light-guide portion 310 and a plurality of prisms 320a. The light-guide plate 300 emits light that enters the light-guide plate 300 through the side surface of the light-guide plate 300 toward an upper space of the light-guide plate 300.

The light-guide potion 310 has substantially a plate shape. The light-guide portion 310 includes an incident surface, an upper surface, and a lower surface. Light that is emitted from the lamp 200 enters the light-guide portion 310 through the incident surface facing the lamp 200. The upper surface is extended from a first side of the incident surface. Light that enters the light-guide portion 310 may exit the light-guide portion through the upper surface. The lower surface is extended from a second side of the incident surface to face the upper surface. The light-guide portion 310 guides light that enters the light-guide portion 310 through the incident surface and transmits the light through the upper surface.

The light-guide portion 310 may include transparent synthetic resins. In one exemplary embodiment, the resin may include PMMA (polymethyl methacrylate). In exemplary embodiments, the thickness of the light-guide portion 310 ranges preferably from about 5 millimeters (mm) to about 15 millimeters (mm).

The prism 320a protrudes from the upper surface of the light-guide portion 310. The prism 320a extends substantially longitudinally along an X-axis. In alternative exemplary embodiments, the prisms 320a may be extended such that a longitudinal direction of the prisms 320a forms a specific angle with respect to X-axis.

A cross-section of each prism 320a, which is taken along a line that is substantially perpendicular to the longitudinal direction of the prism 320a, may have a triangular shape, such as an isosceles triangle shape. A width t1 of each prism 320a ranges from about 20 micrometers (μm) to about 30 micrometers (μm). In one exemplary embodiment, each of the prisms 320a has a width t1 of about 25 μm. The prisms 320a refract light guided by the light-guide portion 310 and exiting from the upper side, and improve uniformity of a front-view luminance of the display device.

The prisms 320a are formed substantially in parallel and spaced apart by a separation distance t2 along Y-axis. In one exemplary embodiment, a separation distance t2 is substantially the same as the width t1 of each prism. In other exemplary embodiments, the distances t1 and t2 may be different from each other.

Figure 3:
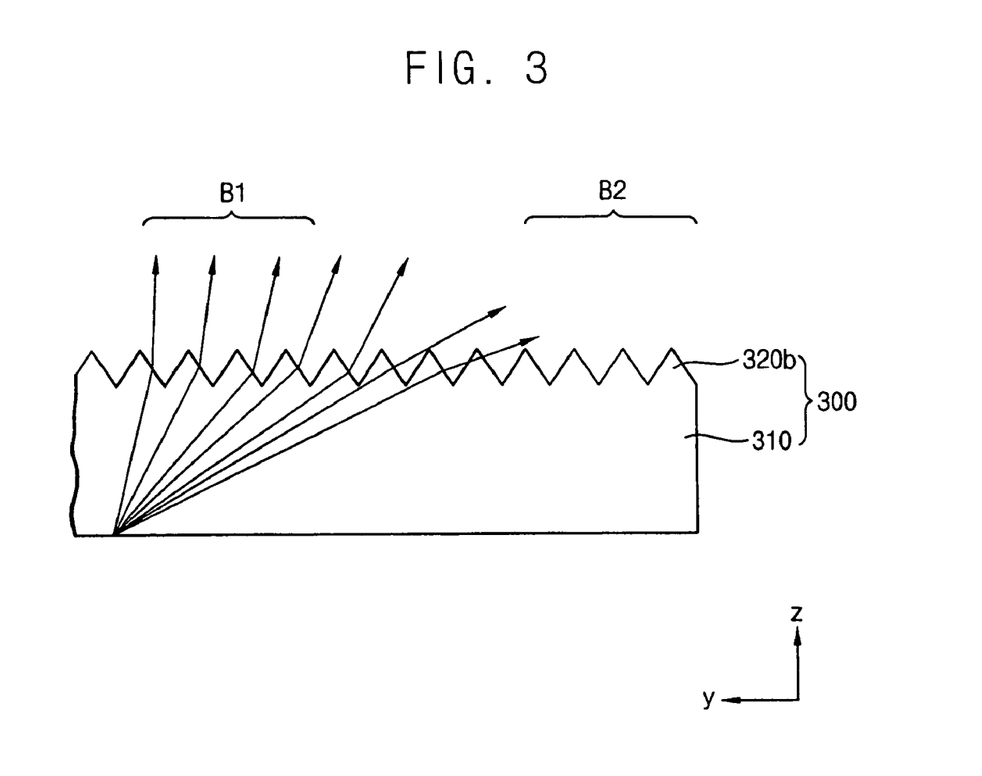
FIG. 3 is a cross-sectional view showing a portion of a light-guide plate having prisms according to another embodiment of the present invention.

FIG. 3 is a cross-sectional view showing a portion of a light-guide plate having prisms according to another embodiment of the present invention.

Referring to FIG. 3, the light-guide plate 300 includes the light-guide portion 310 and the prisms 320b. The prisms 320b protrude from the upper surface of the light-guide portion 310 and extend longitudinally along X-axis. The prisms 320b are disposed such that two of the prisms 320b which are adjacent to each other along Y-axis, make contact with each other. In the illustrated exemplary embodiment of FIG. 3, the prisms 320b contact each other at the bases of the prisms 320b, which may be considered at the upper surface of the light-guide portion 310.

Hereinafter, effects of exemplary embodiments of the light-guide plate according to the present invention will be explained in detail.

The optical path will be described in detail referring to FIG. 2 and FIG. 3. First, referring to FIG. 2, a portion of light entering the light-guide portion 310 is refracted by a reflection pattern formed on the lower surface of the light-guide portion 310 and exits upward through the upper surface of the light-guide portion 310. A first portion of the light entering the light-guide plate 310 is refracted to have an increased angle with respect to the upper surface of the light-guide portion 310 by the prisms 320a and condensed to converge upward. On the other hand, a second part of the light entering the light plate 310 is refracted and spread by the upper surface of the light-guide portion 310 where the prisms 320a are not formed, along the edge, and a third portion of the light is totally reflected by the upper surface of the light-guide portion 310.

Referring to line I-I' of FIG. 1 shown in FIG. 2, when an upper portion of the light-guide plate 300 is divided into two portions, a first portion (A1) of two portions is closer to the middle of the upper surface of the light-guide plate 300 and a second portion (A2) of two portions is adjacent to a side surface not facing the lamp 200. When a space is divided into a first portion A1 disposed over one of the lamps, and a second portion A2 disposed over a space between the lamps, light may be characterized into two portions according to destination of the light. In one exemplary embodiment of the invention, the prisms 320a are formed in parallel and spaced apart by the separation distance t2 that is substantially the same as the width t1 of each prisms 320a, so that a portion of light that advances toward the second portion A2 of space increases to uniformize luminance.

Referring to FIG. 3, however, a large portion of the light-guide plate 310 refracts light by the prisms 320b to advance the portion B1. As a result, a luminance difference between the portions B1 and B2 increases. In other words, a luminance corresponding to the portion B1 is much higher than a luminance corresponding to the portion B2.

When an upper portion of the light-guide plate is divided into a third portion (B1) which is closer to the middle of the upper surface and a fourth portion (B2) which is adjacent to a side surface not facing the lamp, a front-view luminance of the fourth portion (B2) is relatively lower than that of the third portion (B1). On the other hand, a portion of light upwardly refracted by the prisms 320b exits at an angle of about 45° with respect to the upper surface of the light-guide portion 310, thus, the front-view luminance of the fourth portion (B2) is lower when viewed at a angle of about 45° with respect to the upper surface of the light-guide portion 310, thereby to cause whitish in an edge of the light-guide plate.

In the illustrated exemplary embodiments, the prisms 320a are formed in parallel and spaced apart by the separation distance t2. The separation distance t2 is substantially the same as the width t1 of each prisms 320a to decrease luminance of the first portion of space disposed over one of the lamps and increase front-view luminance of the second portion of space disposed over a space between the lamps. Advantageously, the light exiting from the upper side of the light-guide plate has improved luminance uniformity.

Figure 4:
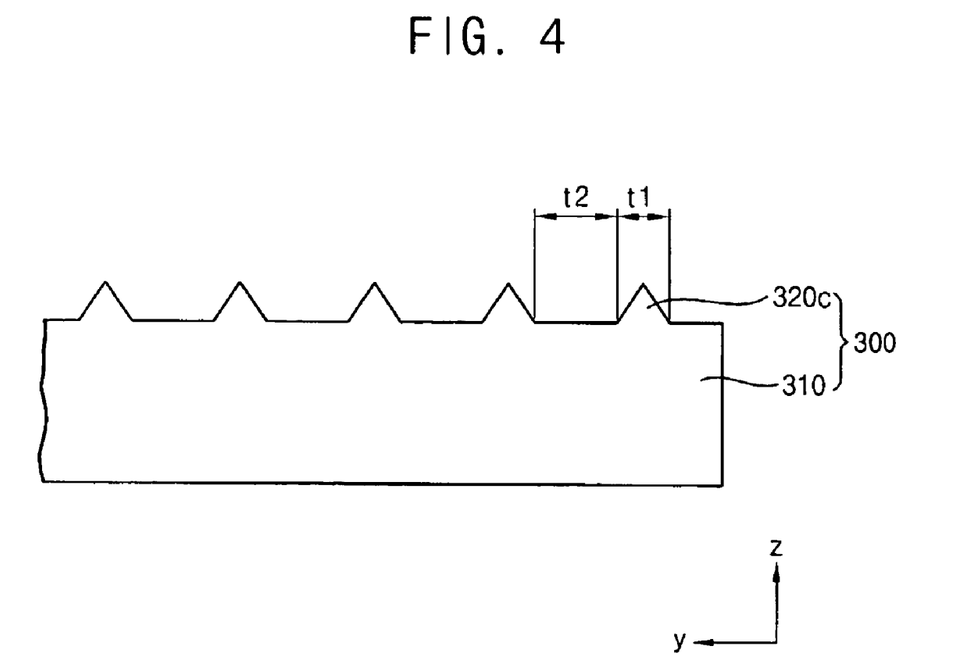
FIG. 4 is a cross-sectional view showing an exemplary embodiment of a portion of a light-guide plate according to the present invention.

FIG. 4 is a cross-sectional view showing another exemplary embodiment of a portion of a light-guide plate according to the present invention. The backlight assembly of the invention is substantially the same as in FIGS. 1-3 except for the light-guide plate. Thus, the same reference numerals will be used to refer to the same parts as those described in FIGS. 1-3 and any further explanation will be omitted.

Referring to FIG. 4, the light-guide plate 300 includes a light-guide portion 310 and a plurality of prisms 320c. The light-guide plate 300 receives light through the side surface of the light-guide plate 300 and transmits the light toward an upper space.

The light-guide potion 310 has substantially a plate shape. The light-guide portion 310 includes an incident surface, an upper surface, and a lower surface. Light that is emitted from the lamp 200 enters the light-guide portion 310 through the incident surface facing the lamp 200. The upper surface is extended from a first side of the incident surface. Light that enters the light-guide portion 310 may exit the light-guide portion through the upper surface. The lower surface is extended from a second side of the incident surface to face the upper surface. The light-guide portion 310 guides light that enters the light-guide portion 310 through the incident surface and transmits the light through the upper surface.

The prism 320c protrudes from the upper surface of the light-guide portion 310 and extends substantially longitudinally along an X-axis. In alternative exemplary embodiments, the prisms 320c may be extended such that a longitudinal direction of the prisms 320c forms a specific angle with respect to X-axis.

A cross-section of each prism 320c, which is taken along a line that is substantially perpendicular to the longitudinal direction of the prism 320c, may have a triangular shape, such as an isosceles triangle shape. A width t1 of each prism 320c ranges from about 20 μm to about 30 μm. In one exemplary embodiments, each of the prisms 320c has a width t1 of about 25 μm. The prisms 320c refract light guided by the light-guide portion 310 and exiting from the upper side, and improve uniformity of a front-view luminance.

The prisms 320c are formed substantially in parallel and spaced apart by a separation distance t2 along Y-axis. In one exemplary embodiment, a separation distance t2 between the prisms 320c is twice the width t1 of each prism 320c. In alternative embodiments, the separation distance t2 may be one and a half times or three times the width t1 of each prism 320c. The separation distance t2 includes a substantially linear separating part that is substantially parallel to the upper surface of the light-guide plate 300. The separating part between the prisms 320c may include other profiles such as an incline or a curvilinear profile.

In the illustrated exemplary embodiment, the prisms 320c are formed in parallel and spaced apart by the separation distance t2 that is greater than the width t1 of each prisms 320c to further decrease luminance of the first portion of space, which is disposed over one of the lamps. The separation distance t2 may be two times the width t1 of each of the prisms 320c.

Figure 5A:
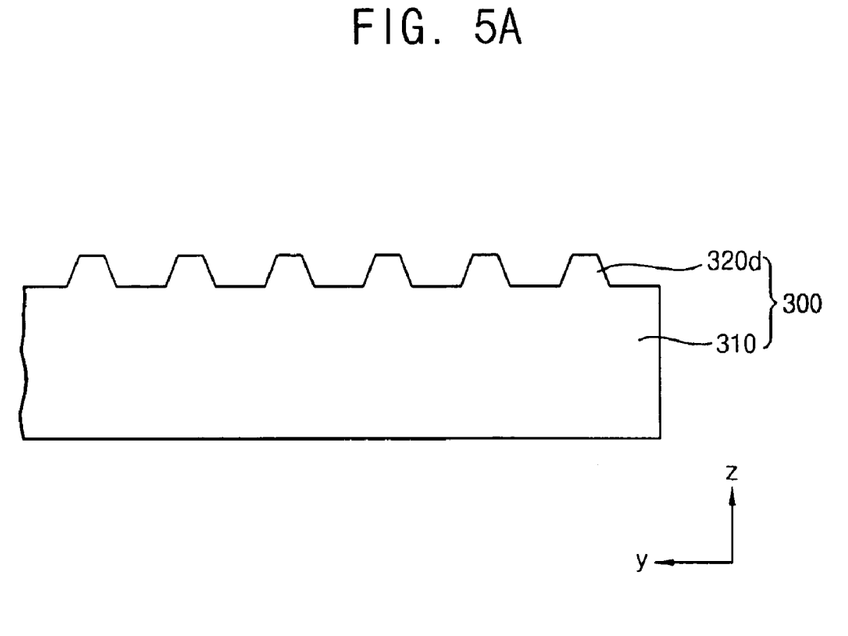
FIGS. 5A and 5B are cross-sectional views showing other exemplary embodiments of a portion of a light-guide plate according to the present invention.
Figure 5B:
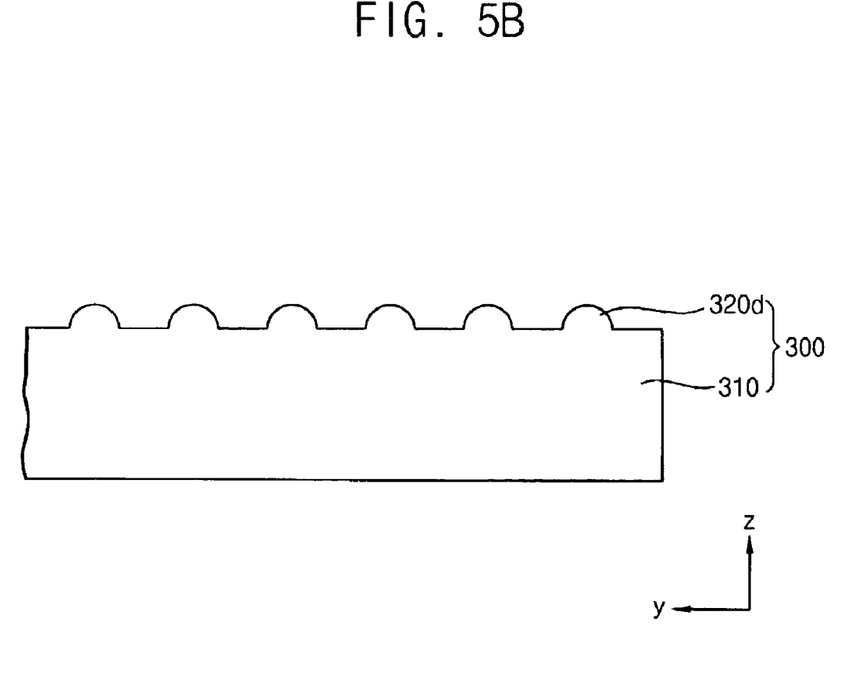

FIGS. 5A and 5B are cross-sectional views showing other exemplary embodiments of a portion of a light-guide plate according to the present invention. The backlight assembly of the invention is the same as in FIGS. 1-3 except for the light-guide plate. Thus, the same reference numerals will be used to refer to the same parts as those described in FIGS. 1-3 and any further explanation will be omitted.

Referring to FIG. 5A, the light-guide plate 300 includes a light-guide portion 310 and a plurality of prisms 320d. The light-guide plate 300 receives light through the side surface of the light-guide plate 300 and transmits the light toward the upper space.

The light-guide portion 310 has substantially a plate shape. The light-guide portion 310 includes an incident surface, an upper surface, and a lower surface. Light that is emitted from the lamp 200 enters the light-guide portion 310 through the incident surface facing the lamp 200. The upper surface is extended from a first edge of the incident surface. Light that enters the light-guide portion 310 may exit the light-guide portion through the upper surface. The lower surface is extended from a second edge of the incident surface to face the upper surface.

The prisms 320d protrude from the upper surface of the light-guide portion 310 and extend substantially longitudinally along the X-axis. The prisms 320d refract light guided by the light-guide portion 310 and exiting from the upper surface, and improve luminance uniformity in a front direction.

The prisms 320d are formed in parallel and spaced apart by a separation distance along Y-axis. In one exemplary embodiment, a separation distance between the prisms 320d is substantially the same as the width t1 of each prism 320d.

In the illustrated embodiment of FIG. 5A, a cross section of each prism 320d, which is taken along a line that is substantially perpendicular to the longitudinal direction of the prisms 320d, may have a trapezoidal shape, such as a bilateral symmetrical trapezoidal shape. In an alternative exemplary embodiment, referring to FIG. 5B, the cross section of each prism 320d may have a semicircular shape.

In the illustrated exemplary embodiments, the cross section of each prism 320d may have a trapezoidal or semicircular shape to condense a first portion of the light that enters the light-guide portion in order to converge upward and diffuse a second part of the light. The separation distance t2 between the prisms 320d may also be substantially the same as the width t1 of each prism 320d.

Figure 6A:
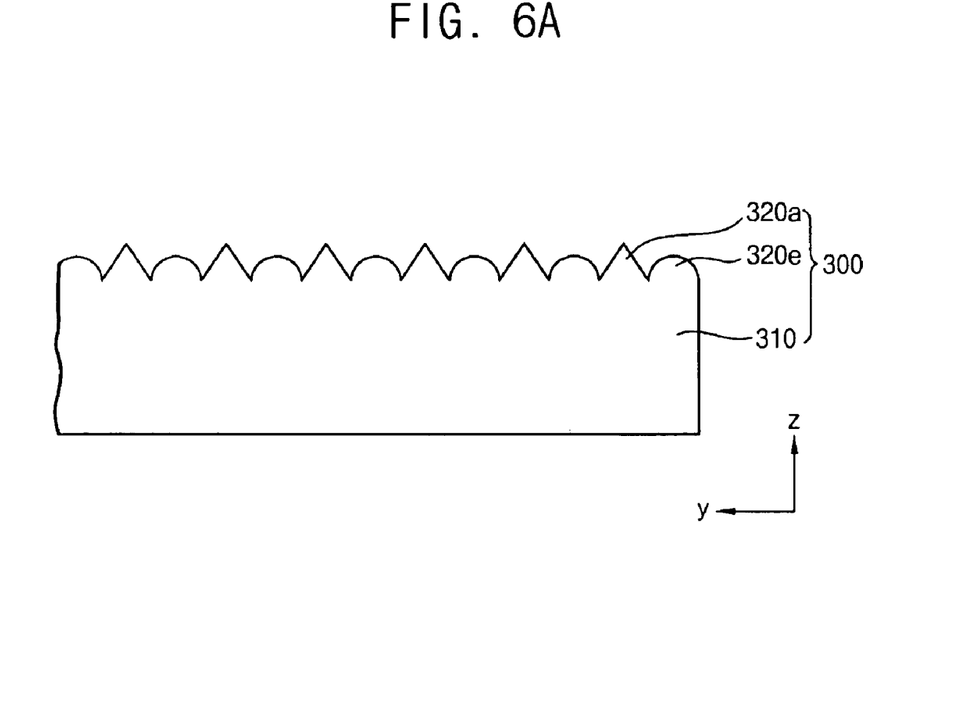
FIGS. 6A and 6B are cross-sectional views showing other exemplary embodiments of a portion of a light-guide plate according to the present invention.
Figure 6B:
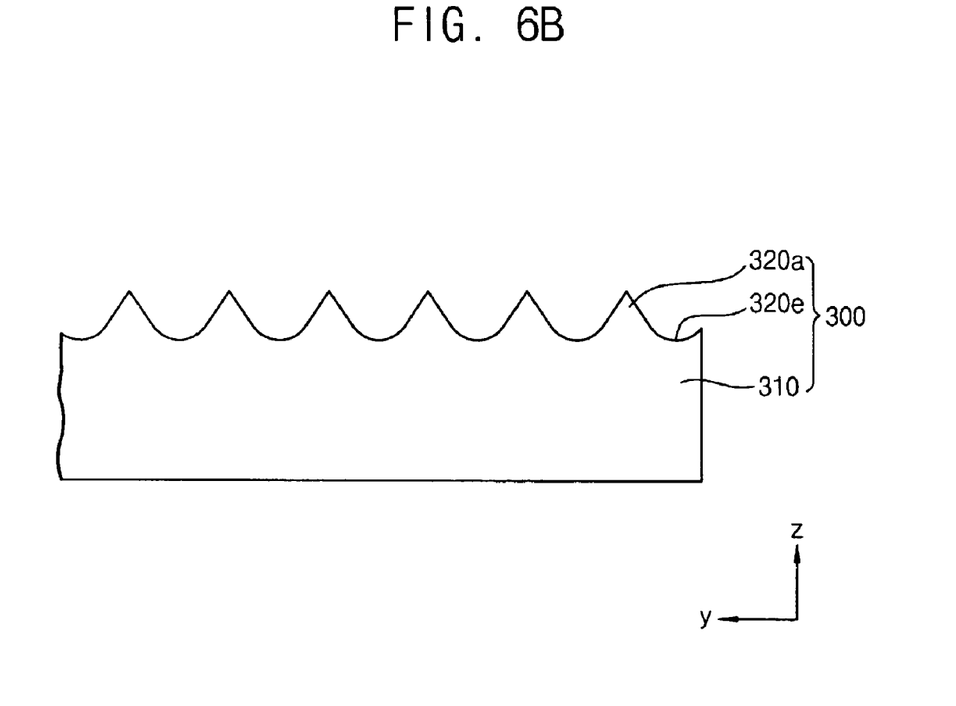

FIGS. 6A and 6B are cross-sectional views showing other exemplary embodiments of a portion of a light-guide plate according to the present invention. The backlight assembly of the invention is the same as in FIGS. 1-3 except for the light-guide plate. Thus, the same reference numerals will be used to refer to the same parts as those described in FIGS. 1-3 and any further explanation will be omitted.

Referring to FIG. 6A, the light-guide plate 300 according to the example embodiment includes a light-guide portion 310 and a plurality of prisms 320a. The light-guide plate 300 receives light through the side surface of the light-guide plate 300 and transmits the light toward the upper space.

The light-guide portion 310 has substantially a plate shape and may include transparent synthetic resins. The light-guide portion 310 includes an incident surface, an upper surface, and a lower surface. Light that is emitted from the lamp 200 enters the light-guide portion 310 through the incident surface facing the lamp 200. The upper surface is extended from a first side of the incident surface. Light that enters the light-guide portion 310 may exit the light-guide portion through the upper surface. The lower surface is extended from a second side of the incident surface to face the upper surface.

The prisms 320a protrude from the upper surface of the light-guide portion 310 and extend substantially longitudinally along the X-axis. A cross section of each prism 320a, which is taken along a line that is substantially perpendicular to a longitudinal direction of the prisms 320a, may have a triangular shape, such as an isosceles triangle shape. The prisms 320a refract light guided by the light-guide portion 310 and exiting from the upper side and improve uniformity of front-view luminance.

The prisms 320a are formed substantially in parallel with each other and spaced apart from each other by a separation distance along Y-axis. In one exemplary embodiment, a separation distance between the prisms 320a is substantially the same as the width of each prism 320a.

Patterns 320e are further formed on the light-guide plate 300. The patterns 320e may be convex or concave. In one exemplary embodiment, referring to FIG. 6A, each of a plurality of convex patterns 320e is formed between the first prisms 320a and may be considered as the separating part between the prisms 320a. The convex patterns 320e protrude from the upper surface of the light-guide portion 310 and extend longitudinally along X-axis. In an alternative embodiment, referring to FIG. 6B, concave patterns 320e are additionally formed between the first prisms 320a. The concave patterns 320e may have a predetermined depth.

In the illustrated exemplary embodiments, convex or concave patterns are formed between the prisms 320a spaced apart by the separation distance to diffuse light exiting from the upper side of the light-guide plate.

Figure 7:
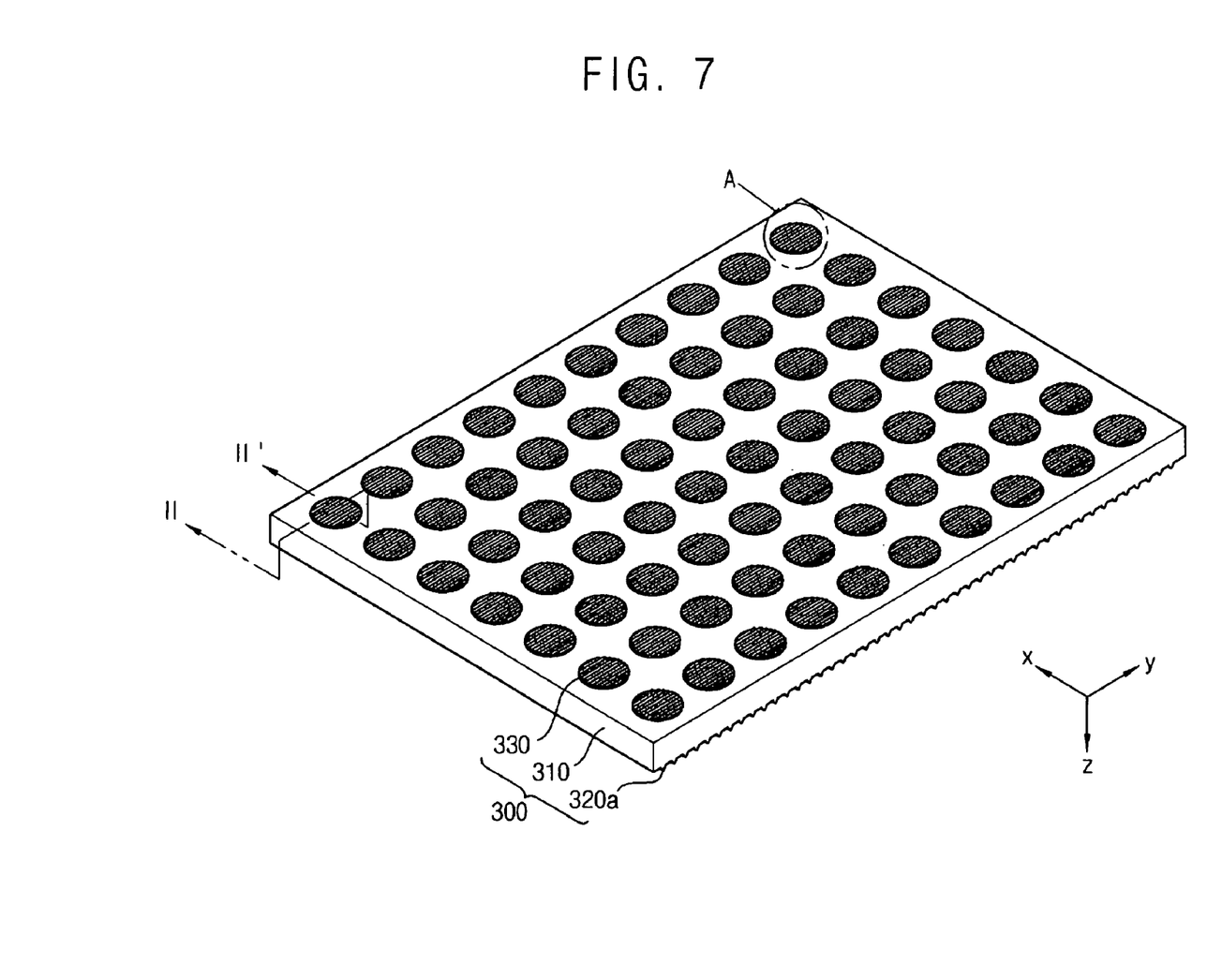
FIG. 7 is a cross-sectional view showing another exemplary embodiment of a light-guide plate according to the present invention.
Figure 8:
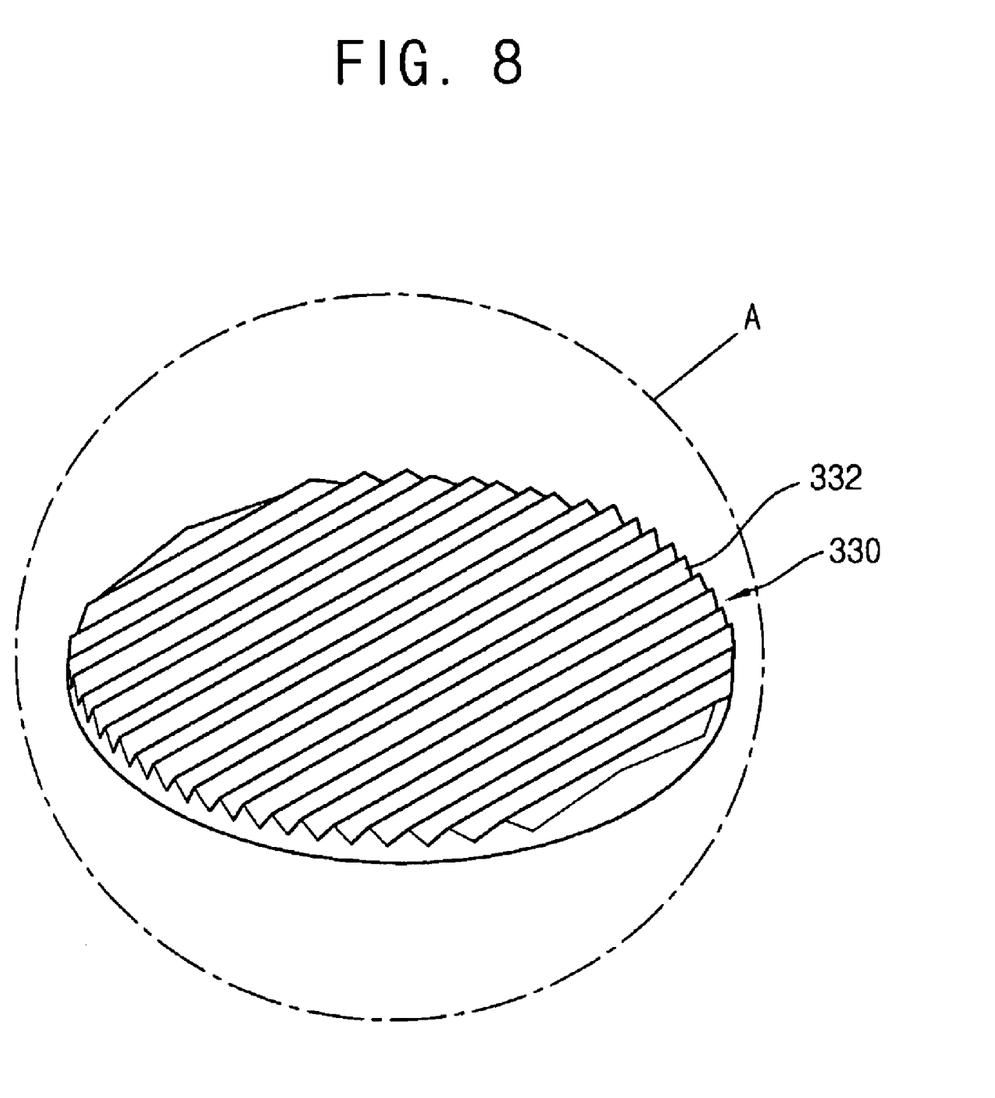
FIG. 8 is an enlarged view showing portion 'A' in FIG. 7.
Figure 9:
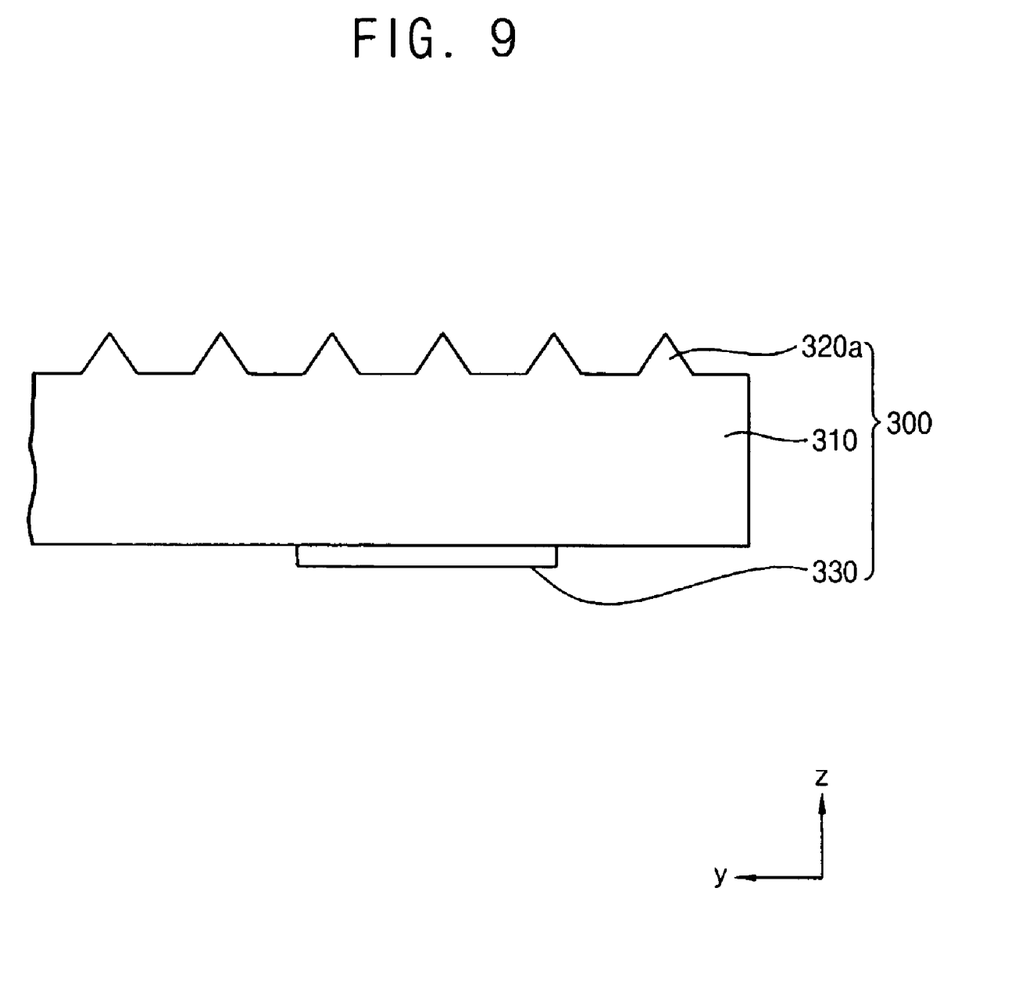
FIG. 9 is a cross-sectional view taken along line II-II' of FIG. 7.

FIG. 7 is a cross-sectional view showing another exemplary embodiment of a light-guide plate according to the present invention, FIG. 8 is an enlarged view showing portion 'A' in FIG. 7, FIG. 9 is a cross-sectional view taken along line II-II' of FIG. 7. The backlight assembly of the invention is the same as in FIGS. 1-3 except for the light-guide plate. Thus, the same reference numerals will be used to refer to the same parts as those described in FIGS. 1-3 and any further explanation will be omitted.

Referring to FIGS. 7, 8 and 9, the light-guide plate 300 includes a light-guide portion 310, a plurality of first prisms 320a and a plurality of dot patterns 330. The light-guide plate 300 receives light through a side surface of the light-guide plate 300 and transmits the light toward the upper space.

The light-guide portion 310 has substantially a plate shape and may include transparent synthetic resins. The light-guide portion 310 includes an incident surface, an upper surface, and a lower surface. Light that is emitted from the lamp 200 enters the light-guide portion 310 through the incident surface facing the lamp 200. The upper surface is extended from a first side of the incident surface. Light that enters the light-guide portion 310 may exit the light-guide portion through the upper surface. The lower surface is extended from a second side of the incident surface to face the upper surface.

The first prisms 320a are protruded from the upper surface of the light-guide portion 310 and extend substantially longitudinally along X-axis. A cross section of each prism 320a, which is taken along a line that is substantially perpendicular to a longitudinal direction of the prisms 320a, may have a triangular shape, such as an isosceles triangle shape. The prisms 320a refract light guided by the light-guide portion 310 and exiting from the upper side and improve uniformity of front-view luminance.

The first prisms 320a are formed substantially in parallel with each other and spaced apart from each other by a separation distance along Y-axis. In one exemplary embodiment, a separation distance between the prisms 320a has substantially the same width as of each prism 320a.

A plurality of the dot patterns 330 are formed on the lower surface of the light-guide portion 310. The dot patterns 330 diffuse and reflect light entering the light-guide portion 310 to change the optical path.

In the illustrated exemplary embodiment, each of the dot patterns 330 has a circular shape when viewed on a plane. In an alternative exemplary embodiment, each of the dot patterns 330 may be polygonal shape when viewed on a plane.

In FIG. 7, the dot patterns 330 have substantially the same size. In alternative embodiments, the dot patterns 330 may have different sizes across the light-guide plate 300.

A plurality of second prisms 332 may be formed adjacent to each other on each dot pattern 330. The second prisms 332 are formed such that a longitudinal direction of the second prisms 332 is substantially perpendicular to a longitudinal direction of the first prisms 320a. A cross section of the second prism 332 may have substantially a triangular shape, such as an isosceles triangle shape.

The second prisms 332 shown in FIG. 7 and 8 are formed such that two adjacent second prisms 332 make contact with each other. In alternative exemplary embodiments, the second prisms 332 may be spaced apart from each other by a separation distance along X-axis. In one exemplary embodiment, the separation distance may have substantially the same width of each of the second prisms 332.

In the illustrated exemplary embodiments, when the second prisms 332 are formed on the dot patterns 330 such that the longitudinal direction of the second prisms 332 is substantially perpendicular to the longitudinal direction of the first prisms 320a, light entering the inside of the light-guide portion may be condensed in X-axis and Y-axis directions. Advantageously, a front-view luminance is more enhanced.

Furthermore, in order to improve luminance in the front direction and with the light-guide plate having first prisms 320a and second prisms 332 intersecting, multiple separate prism sheets may be omitted, thereby simplifying manufacturing processes and lowering costs.

Figure 10:
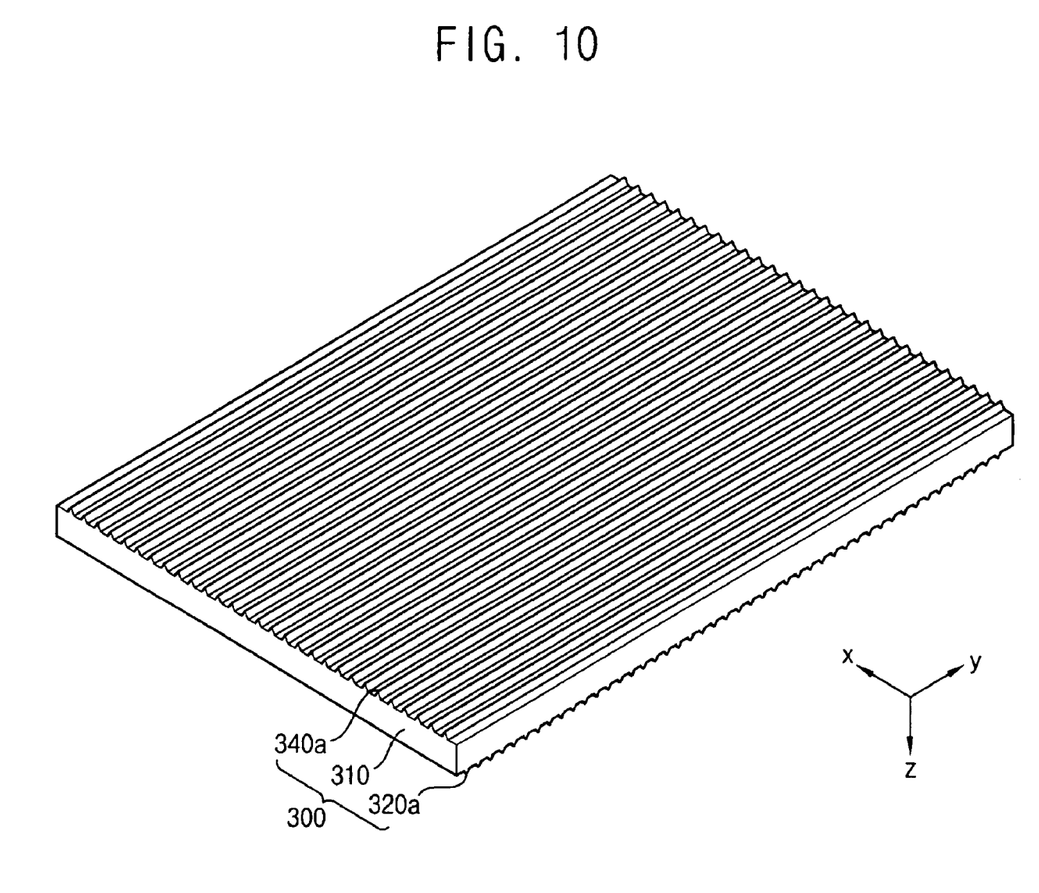
FIG. 10 is a perspective view showing another exemplary embodiment of a light-guide plate according to the present invention.

FIG. 10 is a perspective view showing another exemplary embodiment of a light-guide plate according to the present invention. The backlight assembly of the invention is the same as in FIGS. 1-3 except for the light-guide plate. Thus, the same reference numerals will be used to refer to the same parts as those described in FIGS. 1-3 and any further explanation will be omitted.

Referring to FIG. 10, the light-guide plate 300 includes a light-guide portion 310, a plurality of first prisms 320a and a plurality of second prisms 340a and emits entering the light-guide plate 300 through the side surface toward the upper space.

The light-guide portion 310 has substantially a plate shape and may include transparent synthetic resins. The light-guide portion 310 includes an incident surface, an upper surface, and a lower surface. Light that is emitted from the lamp 200 enters the light-guide portion 310 through the incident surface facing the lamp 200. The upper surface is extended from a first side of the incident surface. Light that enters the light-guide portion 310 may exit the light-guide portion through the upper surface. The lower surface is extended from a second side of the incident surface to face the upper surface.

The first prisms 320a protrude from the upper surface of the light-guide portion 310 and extend longitudinally along the X-axis. A cross section of each prism 320a may have a triangular shape, such as an isosceles triangle shape. The first prisms 320a refract light guided by the light-guide portion 310 and exiting from the upper side and improve luminance uniformity in a front direction.

The first prisms 320a are formed substantially in parallel and spaced apart by a separation distance along the Y-axis. In one exemplary embodiment, a separation distance between the first prisms 320a is substantially the same as the width of each of the first prisms 320a.

The second prisms 340a protrudes from a lower surface of the light-guide portion 310. A cross section of each of the second prisms 340a has a substantially triangular shape, such as an isosceles triangle shape. A width of each of the second prism 340a may range from about 40 μm to about 70 μm. In one exemplary embodiment, the width of each of the second prism 340a is about 50 μm.

The second prisms 340a are spaced apart by a separation distance taken in a direction substantially parallel to the X-axis. The distance may be substantially the same as the width of each of the second prisms 340a. A plurality of second prisms 340a is aligned such that a longitudinal direction of the second prisms 340a is substantially perpendicular to a longitudinal direction of the first prisms 320a. In the illustrated exemplary embodiment, the first prisms 320a formed on the upper surface of the light-guide portion 310 and the second prisms 340a on the lower surface of the light-guide portion 310 are aligned such that the longitudinal direction of the first prisms 320a are substantially parallel with the X-axis and the longitudinal direction of the second prisms 340a are substantially parallel with the Y-axis. Advantageously, light entering the light-guide portion 310 is refracted and condensed to converge upward in both X-direction and Y-direction to enhance front-view luminance. Furthermore, multiple prism sheets are unnecessary.

Figure 11:
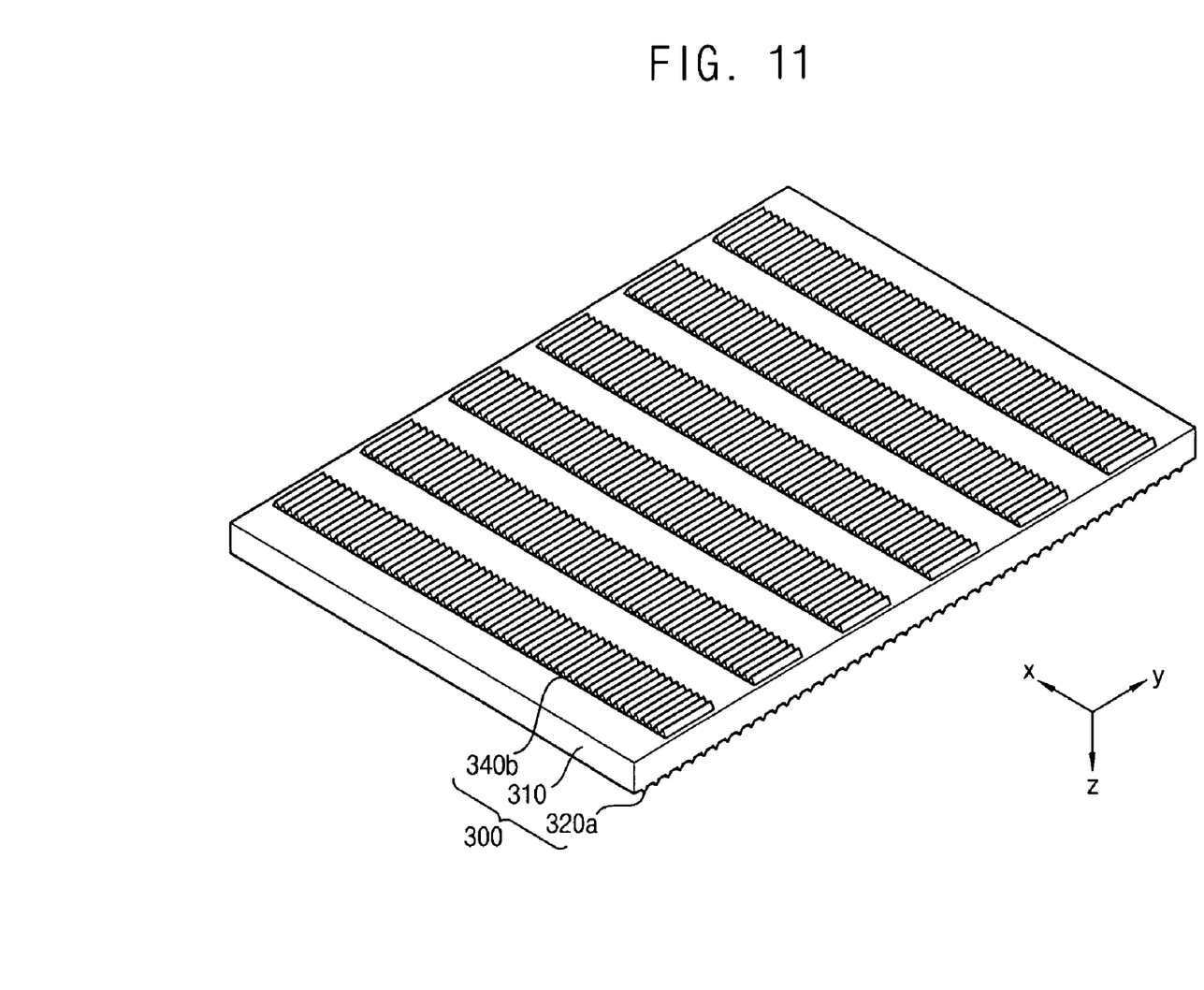
FIG. 11 is a perspective view showing another exemplary embodiment of a light-guide plate according to the present invention.

FIG. 11 is a perspective view showing another exemplary embodiment of a light-guide plate according to the present invention. The backlight assembly of the invention is the same as in FIGS. 1-3 except for the light-guide plate. Thus, the same reference numerals will be used to refer to the same parts as those described in FIGS. 1-3 and any further explanation will be omitted.

Referring to FIG. 11, the light-guide plate 300 includes a light-guide portion 310, a plurality of first prisms 320a and a plurality of second prisms 340b and emits light incident into the side surface of the light-guide plate 300 toward the upper space.

The light-guide portion 310 has substantially a plate shape and may include transparent synthetic resins. The light-guide portion 310 includes an incident surface, an upper surface, and a lower surface. Light that is emitted from the lamp 200 enters the light-guide portion 310 through the incident surface facing the lamp 200. The upper surface is extended from a first side of the incident surface. Light that enters the light-guide portion 310 may exit the light-guide portion through the upper surface. The lower surface is extended from a second side of the incident surface to face the upper surface.

The first prisms 320a protrude from the upper surface of the light-guide portion 310 and extend substantially longitudinally along X-axis. A cross section of each prism 320a may have a triangular shape, such as an isosceles triangle shape. The first prisms 320a refract light guided by the light-guide portion 310 and exiting from the upper side and improve luminance uniformity in a front direction.

The first prisms 320a are formed in parallel and spaced apart by a separation distance along Y-axis. In one exemplary embodiment, a separation distance between the first prisms 320a is substantially the same as the width of each of the first prisms 320a.

The second prisms 340b are protruded from a lower surface of the light-guide portion 310. A cross section of each of the second prisms 340b has a triangular shape, such as an isosceles triangle shape. A longitudinal direction of the second prisms 340b is substantially perpendicular to a longitudinal direction of the first prisms 320a.

Referring to FIG. 11, a plurality of the second prisms 340b are divided into groups of the second prisms 340b the group of the second prisms 340b are discontinuously aligned along the (longitudinal) Y-axis. The groups of second prisms 340b are separated from each other along the Y-axis at a predetermined distance along the Y-axis. In other words, each group of the second prisms 340b are discontinuously formed along Y-axis and the second prisms 340b are formed substantially in parallel adjacent to each other along the X-axis. In alternative embodiments, the second prisms in the same group may be spaced apart from each other along the (transverse) X-direction or along the X and Y directions, such as illustrated in FIG. 7 by the dot patterns 330.

Figure 12:
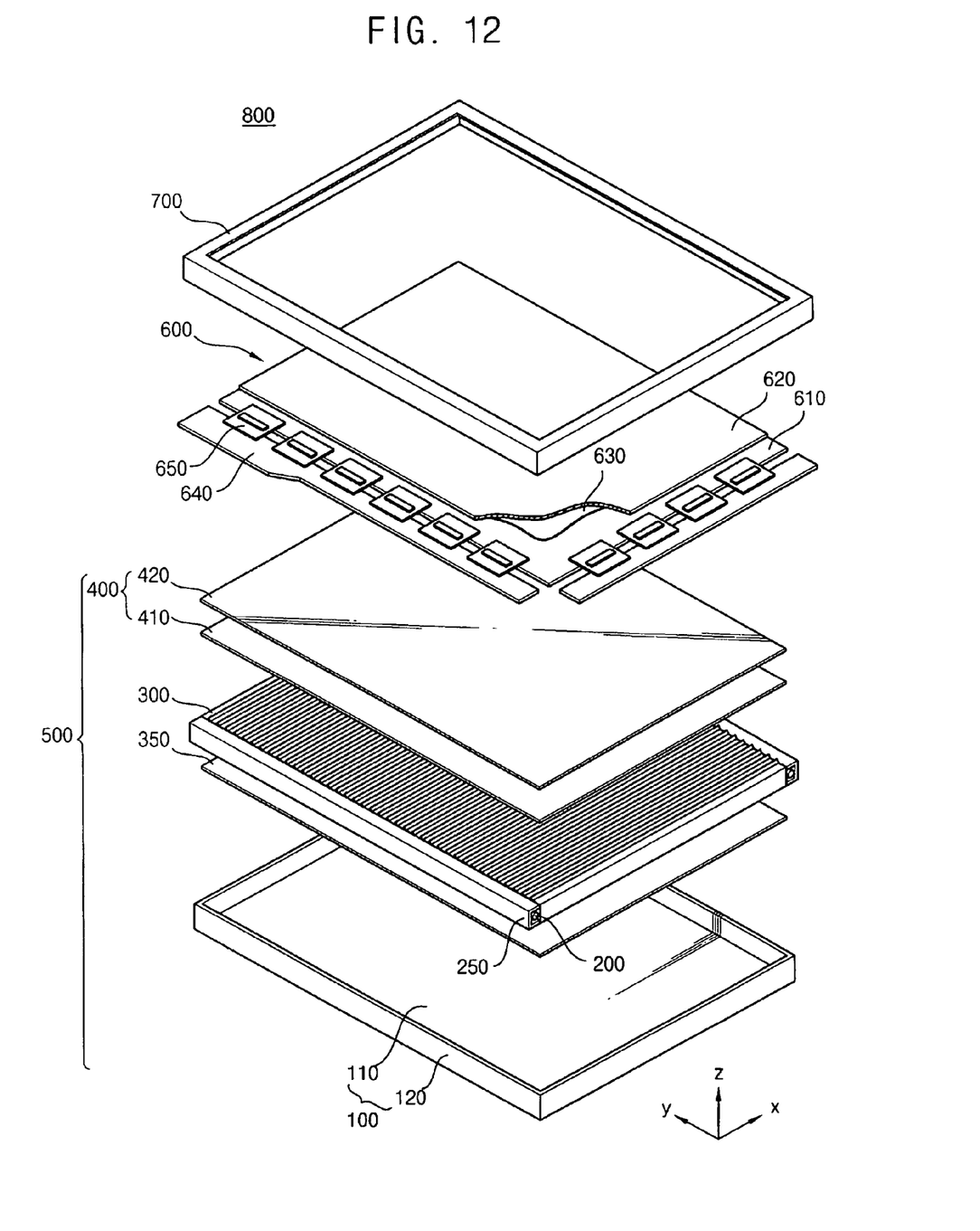
FIG. 12 is an exploded perspective view showing an exemplary embodiment of a display device according to the invention.

FIG. 12 is an exploded perspective view showing an exemplary embodiment of a display device according to the present invention. The backlight assembly of the display device of the invention is the same as in FIGS. 1-3 except for the light-guide plate. Thus, the same reference numerals will be used to refer to the same parts as those described in FIGS. 1-3 and any further explanation will be omitted.

Referring to FIG. 12, the display device 800 includes a backlight assembly 500 for generating light, a display panel 600 disposed over the backlight assembly 500 and a top chassis 700 for fixing the display panel.

The display panel 600 is disposed over the optical sheets 400. The display panel 600 displays images by using the light exiting from the optical sheets 400. The display panel 600 includes a first substrate 610, a second substrate 620, a liquid crystal layer 630, a printed circuit board 640 and a flexible circuit board 650.

The first substrate 610 includes a plurality of the pixel electrodes (not shown) arranged in a matrix configuration and thin film transistors (TFTs) for applying a driving voltage to each of the pixel electrodes and signal lines for operating each of the TFTs.

The pixel electrode may be formed through patterning by using photolithography and etching of indium tin oxide film (ITO), indium zinc oxide film (IZO), amorphous indium tin oxide film (a-ITO), and the like.

The second substrate 620 is disposed opposite to the first substrate 610. The second substrate 620 includes a common electrode (not shown) having an optically transparent and electrically conductive material disposed on the whole side of the second substrate 620 and color filters facing the pixel electrodes, respectively.

The color filters may include a red color filter selectively transmitting red components, a green color filter transmitting green components and/or a blue color filter transmitting blue components.

The liquid crystal layer 630 is disposed between the first substrate 610 and the second substrate 620 and an arrangement of liquid crystal molecules are altered by an electric field generated between the pixel electrode and the common electrode. The rearranged liquid crystal layer 630 controls light transmission rate of the light passing through the optical sheets 400 and the controlled light passes through the color filters to display the images.

The printed circuit board 640 may include a data printed circuit board and a gate printed circuit board. The data printed circuit board is bent by the flexible circuit board 650 to be disposed on a lateral side or a back side of the receiving container 100. In exemplary embodiments, the gate printed circuit board may be optional by forming a separate signal line on the first substrate 610 or the flexible circuit board 650.

The printed circuit board 640 and the first substrate 610 are electrically connected by the flexible circuit board 650. The flexible circuit board 650 provides a driving signal generated from the printed circuit board 640 to the first substrate 610. In exemplary embodiments, the flexible circuit board 650 may be a tape carrier package (TCP) or a chip on film (COF).

The top chassis 700 is combined with the side portions 120 to fasten the display panel 600 to the backlight assembly 500. The top chassis 700 reduces or effectively prevents damage of the display panel 600 and separation of the display panel 600 from the backlight assembly.

In the illustrated exemplary embodiments, the first prisms of the light-guide plate are separated from each other to lower a luminance of light advancing toward a first space disposed over lamps and to raise a luminance of light advancing toward a second space disposed over a space between the lamps. Advantageously, luminance uniformity is enhanced to enhance display quality.

Additionally, in the illustrated exemplary embodiments, the dot prism patterns may be formed on a lower surface of a light-guide portion such that a longitudinal direction of the dot prism patterns is substantially perpendicular to a longitudinal direction of the first prisms. Advantageously, a front-view luminance may be enhanced along X-axis and Y-axis.

Additionally, in the illustrated exemplary embodiments, second prisms may be formed on a lower surface of a light-guide portion such that a longitudinal direction of the second prism patterns is substantially perpendicular to a longitudinal direction of the first prisms. Advantageously, a front-view luminance may be enhanced along X-axis and Y-axis.

Although the example embodiments of the present invention have been described, it is understood that the present invention should not be limited to these example embodiments but various changes and modifications can be made by one ordinary skilled in the art within the spirit and scope of the present invention as hereinafter claimed.

What is claimed is:

1. A light-guide plate comprising:
an incident surface receiving light;
an upper surface extended from a first side of the incident surface;
a lower surface opposed to the upper surface;
a plurality of first prisms protruding from the upper surface and spaced apart by a separation distance; and
a plurality of groups of second prisms formed on the lower surface, the groups of the second prisms diffusing and reflecting light,
wherein the second prisms within each group are spaced apart from each other along a direction substantially perpendicular to a longitudinal direction of the second prisms.

2. The light-guide plate of claim 1, wherein the separation distance between the first prisms is substantially same as a width of each prism.

3. The light-guide plate of claim 1, wherein the separation distance between the first prisms is twice the width of each prism.

4. The light-guide plate of claim 1, wherein a width of each first prism ranges from about 20 micrometers (μm) to about 30 micrometers (μm).

5. The light-guide plate of claim 1, wherein a thickness of the light guide plate ranges from about 5 millimeters (mm) to about 15 millimeters (mm).

6. The light-guide plate of claim 1, wherein a cross section of the first prisms has substantially a triangular shape.

7. The light-guide plate of claim 1, wherein a cross section of the first prisms has substantially a trapezoidal shape.

8. The light-guide plate of claim 1, wherein a cross section of the first prisms has substantially a semicircular shape.

9. The light-guide plate of claim 1, further comprising convex patterns formed between the first prisms.

10. The light-guide plate of claim 1, further comprising concave patterns formed between the first prisms.

11. The light-guide plate of claim 1, wherein each of the groups of the second prisms is formed in a dot pattern on the lower surface, the dot patterns diffusing and reflecting light.

12. The light-guide plate of claim 11, wherein each of the dot patterns has a substantially circular shape when viewed on a plane.

13. The light-guide plate of claim 11, wherein each of the dot patterns has a substantially polygonal shape when viewed on a plane.

14. The light-guide plate of claim 1, wherein a longitudinal direction of the second prisms is substantially perpendicular to a longitudinal direction of the first prisms.

15. The light-guide plate of claim 1, wherein a cross section of the second prisms has substantially a triangular shape.

16. The light-guide plate of claim 1, wherein the groups of the second prisms are arranged discontinuously in a longitudinal direction of the second prisms, and each group of the second prisms is continuous and extended in a direction perpendicular to the longitudinal direction of the second prisms.

17. The light-guide plate of claim 1, wherein the groups of the second prisms are arranged discontinuously along a longitudinal and a transverse direction of the second prisms.

18. The light-guide plate of claim 1, wherein a width of each of the second prism ranges from about 40 μm to about 70 μm.

19. A backlight assembly, comprising:
a lamp generating light; and
a light-guide plate comprising:
an incident surface receiving the light emitted from the lamp;
an upper surface extended from one side of the incident surface and including a plurality of first prisms spaced apart by a separation distance;
a lower surface opposed to the upper surface; and
a plurality of groups of second prisms formed on the lower surface, the groups of the second prisms diffusing and reflecting light,
wherein the second prisms within each group are spaced apart from each other along a direction substantially perpendicular to a longitudinal direction of the second prisms.

20. The backlight assembly of claim 19, wherein a longitudinal direction of the first prisms is substantially perpendicular to a longitudinal direction of the lamp.

21. The backlight assembly of claim 19, wherein a longitudinal direction of the second prisms is substantially perpendicular to a longitudinal direction of the first prisms.

22. The backlight assembly of claim 21, wherein a longitudinal direction of the second prisms is substantially parallel with a longitudinal direction of the lamp.

23. A display device comprising:
a display panel displaying images using light; and
a backlight assembly supplying the light to the display panel;
wherein the backlight assembly comprises:
a lamp generating light; and
a light-guide plate comprising:
an incident surface receiving the light emitted from the lamp;
an upper surface extended from one side of the incident surface and having a plurality of first prisms spaced apart by a separation distance;
a lower surface opposed to the upper surface; and
a plurality of groups of second prisms formed on the lower surface, the groups of the second prisms diffusing and reflecting light,
wherein the second prisms within each group are spaced apart from each other along a direction substantially perpendicular to a longitudinal direction of the second prisms.

\* \* \* \* \*